US011080028B1

(12) United States Patent
Staroverova et al.

(10) Patent No.: US 11,080,028 B1
(45) Date of Patent: Aug. 3, 2021

(54) CONDENSER FOR USER INTERFACE CHANGES

(71) Applicant: SAP SE, Walldorf (DE)

(72) Inventors: Larisa Staroverova, Wiesloch (DE); Tamara Fuchs, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/904,858

(22) Filed: Jun. 18, 2020

(51) Int. Cl.
*G06F 9/44* (2018.01)
*G06F 8/38* (2018.01)
*H04L 29/08* (2006.01)

(52) U.S. Cl.
CPC ............... *G06F 8/38* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 2004/0111398 A1* | 6/2004 | England | ................. | H04L 67/38 |
| 2007/0143247 A1* | 6/2007 | Brunswig | ................. | G06F 16/25 |
| 2009/0125799 A1* | 5/2009 | Kirby | ................. | G06F 16/957 |
| | | | | 715/234 |
| 2014/0189557 A1* | 7/2014 | O'Connell, Jr. | ...... | G06F 16/958 |
| | | | | 715/767 |
| 2014/0229910 A1* | 8/2014 | Frenkiel | ................. | G06F 8/36 |
| | | | | 717/104 |
| 2015/0095340 A1* | 4/2015 | Bishop | ................. | G06F 16/907 |
| | | | | 707/741 |
| 2021/0026508 A1* | 1/2021 | Jacobs | ................. | G06F 9/543 |

* cited by examiner

*Primary Examiner* — Qamrun Nahar
(74) *Attorney, Agent, or Firm* — Buckley, Maschoff & Talwalkar LLC

(57) ABSTRACT

Systems and methods provide reception of a request from a client system for a user interface (UI) application, identification of a plurality of UI changes associated with the UI application and comprising one or more non-index-related UI changes and one or more index-related UI changes, each of the one or more non-index-related UI changes associated with a UI node and a UI node characteristic, and each of the one or more index-related UI changes associated with a UI node index, sorting of each of the one or more non-index-related UI changes based on associated UI node and UI node characteristic, condensing of non-index-related UI changes associated with each UI node characteristic of each UI node to zero or one UI changes associated with each UI node characteristic of each UI node, condensing of each of the one or more index-related UI changes to less than the one or more index-related UI changes based the UI node indices, and transmission of the UI application, the condensed non-index-related UI changes and the condensed index-related UI changes to the client system.

20 Claims, 13 Drawing Sheets

500

| UI CHANGE ID | UI NODE | UI CHANGE TYPE | UI CHANGE DETAILS |
|---|---|---|---|
| C1 | FN | Rename | Label: Name |
| C2 | FN | Property | Width: 35% |
| C3 | FN | Hide/Unhide | |
| C4 | FN | Hide/Unhide | |
| C5 | FN | Rename | Label: Given Name |
| C6 | FN | Property | Width: 45% |
| C7 | FN | Rename | Label: Surname |

```
mReducedChanges: {
 FN: {
  nonIndexRelated: {
  lastOneWins: {
   label: [C7]
  }
  }
 }
}
```

```
mReducedChanges: {
 FN: {
  nonIndexRelated: {
  lastOneWins: {
   label: [C7],
   width: [C6]
  }
  }
 }
}
```

```
mReducedChanges: {
 FN: {
  nonIndexRelated: {
   lastOneWins: {
    label: [C7],
    width: [C6]
   },
   reverse: {
    visible: [C4, C3]
   }
  }
 }
}
```

```
mReducedChanges: {
 FN: {
  nonIndexRelated: {
   lastOneWins: {
    label: [C7],
    width: [C6]
   }
  }
 }
}
```

*FIG. 9*

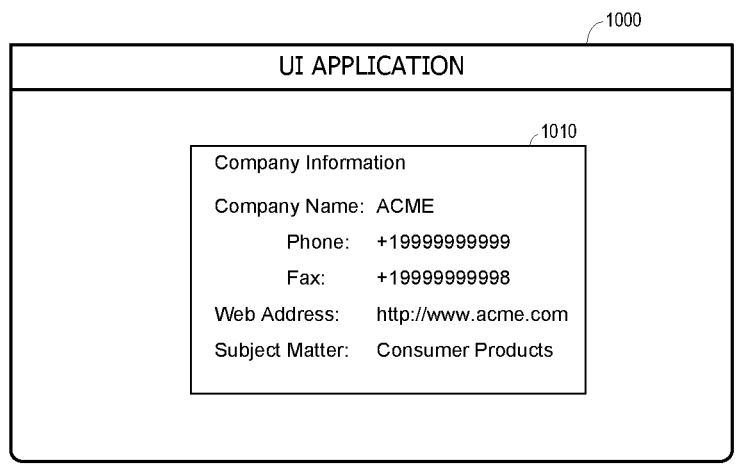
FIG. 10
| UI CHANGE ID | UI NODE | UI CHANGE TYPE | UI CHANGE DETAILS |
|---|---|---|---|
| C1 | SM | Move | Srce: 4 Trgt: 1 |
| C2 | P | Move | Srce: 1 Trgt: 3 |
| C3 | URL | Move | Srce: 4 Trgt: 0 |
| C4 | CN | Move | Srce: 2 Trgt: 0 |
| C5 | SM | Move | Srce: 0 Trgt: 1 |
| C6 | P | Move | Srce: 3 Trgt: 0 |
| C7 | URL | Move | Srce: 0 Trgt: 2 |
| C8 | CN | Move | Srce: 0 Trgt: 3 |
FIG. 11
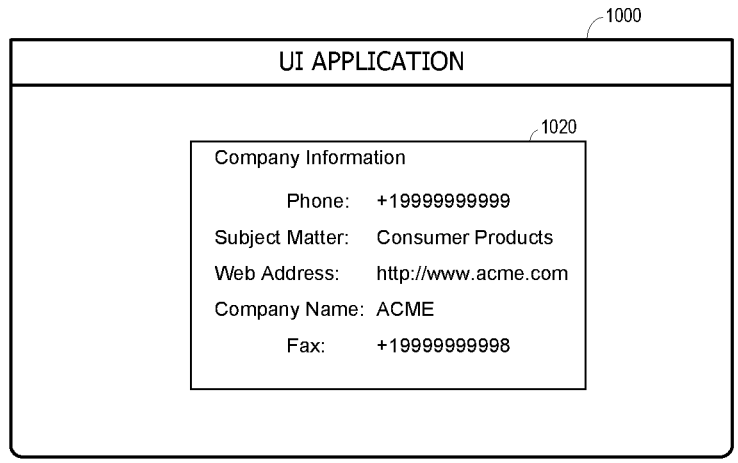
FIG. 12

1300

```
mReducedChanges: {
 CN: {
  IndexRelated: {
  move: [C8]
  }
 }
}
```

```
mReducedChanges: {
 CN: {
  IndexRelated: {
  move: [C8]
  }
 },
 URL: {
  IndexRelated: {
  move: [C7]
  }
 },
 P: {
  IndexRelated: {
  move: [C6]
  }
 },
 SM: {
  IndexRelated: {
  move: [C5]
  }
 },
}
```

```
mUIReconstructions: {
 "companyinfo": {
  "targetUI": ["P", "SM", "URL", "CN", "F"],
  "initialUI": ["CN", "P", "F", "URL", "SM"],
 }
}
```

CONDENSER FOR USER INTERFACE CHANGES

BACKGROUND

Conventional software architectures may include a user interface layer, a service layer and a data layer. An end-to-end application may therefore include a user interface application at the user interface layer, server code implementing application logic at the service layer, and database artifacts at the data layer. The user interface application may utilize generally-available code libraries for implementing some user interface controls. For example, UI5 is an application framework which includes downloadable code libraries and facilitates the design of cross-platform applications.

Conventional user interface (UI) applications may include an adaptation mode which allows authorized users (e.g., administrators, key users) to modify the UIs of the UI applications. For example, adaptation mode may allow a user to rename, move, enlarge and delete UI areas, or nodes. Each such change is typically saved to a backend database as a "UI change" record. Upon accessing a UI application, all such UI changes are collected and applied to the UI application, which often results in long startup times. Long startup times are frustrating to users, who must wait for complete loading of the UI application before use thereof.

Systems are desired to efficiently reduce startup times associated with the application of UI changes to a UI application.

BRIEF DESCRIPTION OF THE DRAWINGS

FIG. 5 is a tabular representation of a plurality of non-index-related UI changes according to some embodiments.

FIG. 6 is a view of a data structure for storing condensed UI changes according to some embodiments.

FIG. 7 is a view of a data structure for storing condensed UI changes according to some embodiments.

FIG. 8 is a view of a data structure for storing condensed UI changes according to some embodiments.

FIG. 9 is a view of a data structure for storing condensed UI changes according to some embodiments.

FIG. 10 is a view of a user interface of a user interface application according to some embodiments.

FIG. 11 is a tabular representation of a plurality of index-related UI changes according to some embodiments.

FIG. 12 is a view of a user interface of a user interface application according to some embodiments.

FIG. 13 is a view of a data structure for storing condensed UI changes according to some embodiments.

FIG. 14 is a view of a data structure for storing condensed UI changes according to some embodiments.

FIG. 15 is a view of a data structure for storing UI reconstruction information according to some embodiments.

DETAILED DESCRIPTION

The following description is provided to enable any person in the art to make and use the described embodiments. Various modifications, however, will remain readily-apparent to those in the art.

Some embodiments facilitate the processing of UI changes by efficiently condensing a set of UI changes into a smaller set of UI changes. Advantageously, applying the smaller set of UI changes to the UI application results in the same modified UI application as would have resulted from applying the original set of UI changes to the UI application. Some embodiments are capable of processing non-index-related UI changes (e.g., rename, hide, change property) and index-related UI changes (e.g., move, create, destroy).

Figure 1:
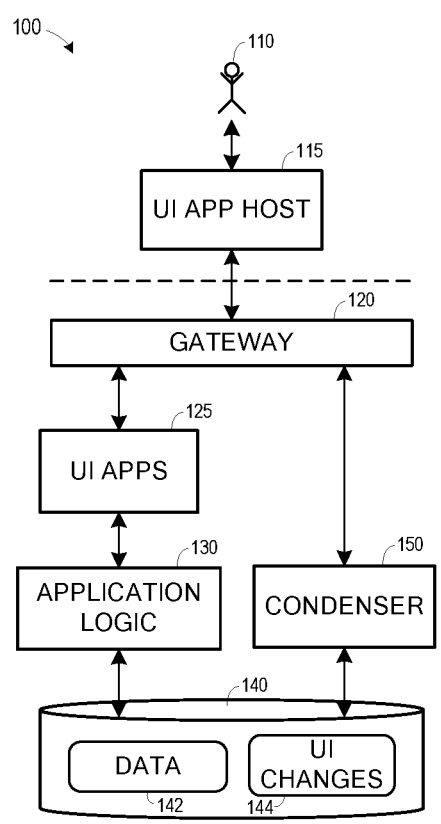
FIG. 1 illustrates an architecture to provide condensed UI changes to end-users according to some embodiments.

FIG. 1 is a block diagram of architecture 100 according to some embodiments. The illustrated elements of architecture 100 may be implemented using any suitable combination of computing hardware and/or software that is or becomes known. In some embodiments, two or more elements of architecture 100 are implemented by a single computing device. One or more elements of architecture 100 may be implemented as an on-premise system and/or a cloud service (e.g., Software-as-a-Service, Platform-as-a-Service).

During operation, end-user 110 may operate UI application host 115 (e.g., a launchpad application executing within a Web browser) to request, via gateway 120, a UI application of UI applications 125. The requested UI application 125 may interact with application logic 130 as is known in the art to access data 142 of database 140. For example, application logic 130 generate queries against data 142 and return results to UI applications 125 as is known in the art.

Data 142 stored within database 140 may comprise one or more of conventional tabular data, row-based data, column-based data, and object-based data. The data may be distributed among several relational databases, dimensional databases, and/or other data sources. Moreover, the data may be indexed and/or selectively replicated in an index to allow fast searching and retrieval thereof.

Database 140 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

As mentioned above, certain UI applications 125 may support modes which allow certain users to change the presented UIs. A key user may activate such a mode in order to make such changes, which are then saved in database 140 as UI changes 144. Each of UI changes 144 may indicate a UI application 125 to which it pertains, a UI container affected by the UI change, a UI node of the container which is being changed, a type of the UI change (e.g., rename), and associated parameter values (e.g., "New Name"), if applicable.

According to some embodiments, reception of a request for a UI application 125 from UI application host 115 triggers a determination of whether any UI changes 144 are associated with the UI application 125. According to some embodiments, this determination is triggered only if UI application host 115 has been configured to operate in a mode which allows UI changes to be applied to requested UI applications.

If any UI changes 144 are associated with the UI application 125, condenser 150 condenses the UI changes 144 into a smaller subset of UI changes as will be described in detail below. Condensation of the UI changes is intended to remove redundant UI changes and to provide a net change to the UI application 125 which is identical to the net change which would be provided if all of the pre-condensed UI changes associated with the UI application 125 were applied thereto.

The condensed UI changes are returned to UI application host 115 along with the requested UI application 125. UI application host 115 proceeds to apply the changes to the UI application 125 during loading thereof as is known in the art, and the changed UI application 125 is presented to user 110. Due to the reduced number of UI changes, loading of the UI application 125 consumes less time and processing resources than a case in which all of the associated UI changes 144 were applied to the UI application 125.

Figure 2:
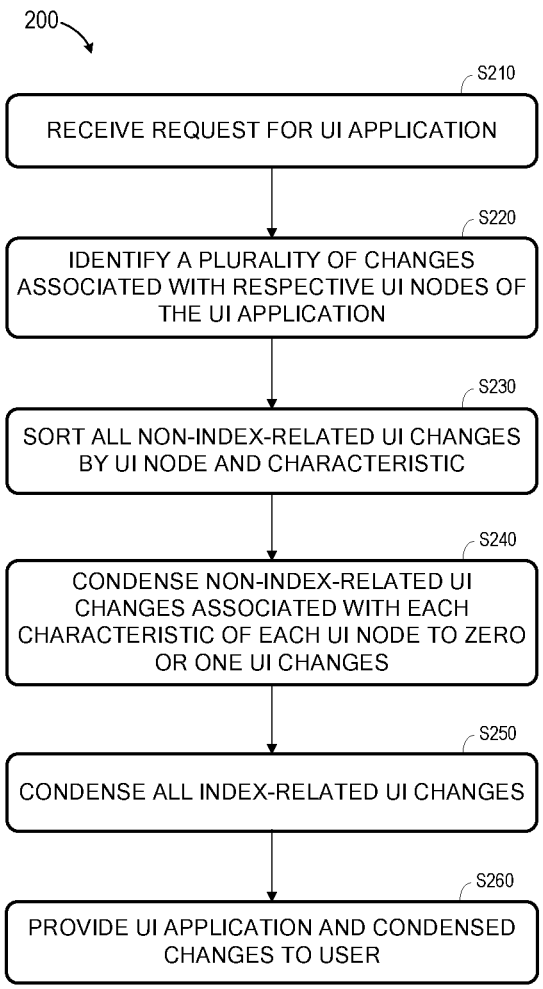
FIG. 2 is flow diagram of a process to provide condensed UI changes to end-users according to some embodiments.

FIG. 2 is a flow diagram of process 200 according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, a request for a UI application is received at S210. The request may be received via any process that is or becomes known. For example, a user may operate a client device (e.g., a desktop computer) to execute a Web browser application. The user may select or otherwise input a Uniform Resource Locator associated with a UI application host, or launchpad, causing the Web browser to display a corresponding Web page. According to some embodiments, the user is subjected to an authorization protocol (e.g., password, multi-factor authentication) prior to being presented with the launchpad Web page.

The launchpad Web page may display tiles corresponding to various UI applications which may be selected to "launch" a respective UI application. It will be assumed that the user selects one of the tiles, causing a back-end server to receive a request for the corresponding UI application at S210.

Next, at S220, a plurality of UI changes associated with the UI application are identified. According to some embodiments, S220 includes a determination of whether the requested UI application should be updated with associated UI changes prior to providing the UI application to the user. The determination may be based on a configuration setting (e.g., a "flexibility mode" setting) associated with the user.

The identified plurality of UI changes may have been created by one or more users, such as one or more key users and/or administrators. The UI changes may include index-related change types which affect the index position of UI nodes (e.g., UI field, UI control, UI column) within a UI container (e.g., group, section, page), and/or non-index-related changes which affect a characteristic of a UI node.

The plurality of UI changes may be stored in a back-end database in association with the UI application to which they apply.

Any identified non-index-related changes are sorted by UI node and affected characteristic (e.g., visibility, label, width) at S230. Accordingly, if two or more non-index-related changes are associated with a same UI node and a same characteristic of the UI node, those two or more non-index-related changes are sorted together. At S240, and for each characteristic of each UI node, the associated non-index-related changes are condensed into one or zero UI changes.

In one example of S240, the identified UI changes include a first UI change which changes a label of a UI node to "first", a second, later-created, UI change which changes the label of the UI node to "premier" and a third, last-created, UI change which changes the label of the UI node to "initial". As will be described, since a Rename change type is associated with a "last-one-wins" resolution, the three UI changes are condensed to the single UI change which changes the label of the UI node to "initial".

In another example of S240, the identified UI changes include a UI change which hides another UI node and a UI change which unhides the UI node. As will be described, since a Hide/Unhide change type is associated with a "reverse" resolution, these two UI changes are condensed to an empty set of UI changes (i.e., none).

Next, at S250, all index-related UI changes are condensed into a smaller set of index-related UI changes associated with respective UI nodes. For example, if the index-related UI changes include a UI change which creates a node and a subsequent UI change which destroys the node, these UI changes may be condensed to an empty set of UI changes (i.e., none). Similarly, if a node is associated with two or more "move" UI changes, the two or more "move" UI changes may be condensed to a single "move" UI change. Condensing of index-related UI changes according to some embodiments will be described in detail below.

The requested UI application and the condensed index-related and non-index-related changes are provided to the user at S260. With reference to FIG. 1, UI application host 115 may receive the UI application and condensed UI changes via gateway 120. UI application host 115 may then apply the UI changes to the UI application during loading thereof, and then present the changed UI application to user 110.

Figure 3:
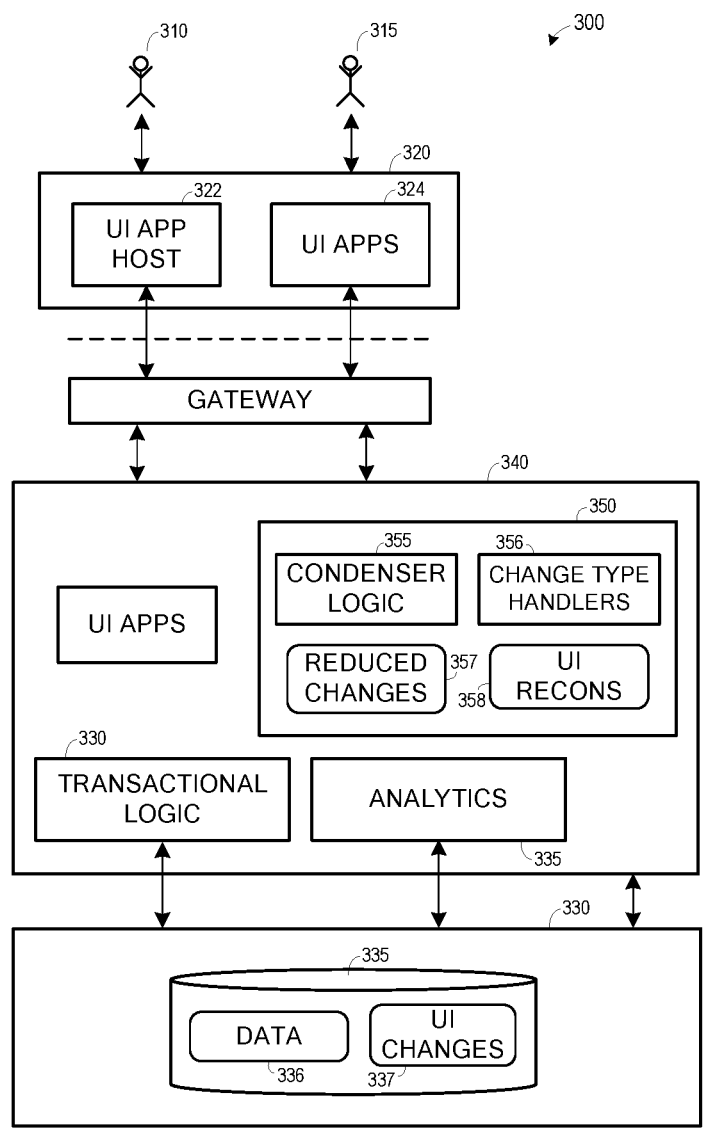
FIG. 3 illustrates an architecture to create UI changes and provide condensed UI changes to end-users according to some embodiments.

Architecture 300 of FIG. 3 illustrates system 300 to create and store UI changes and condense created UI changes according to some embodiments. End-user 310 may access UI software component 320 (e.g., a Web browser) which supports UI application host 322 and UI applications 324. UI application host 322 may provide an entry point to UI applications 324, and both may access transactional logic 330 and analytics 335 implemented by server-executable code and executing within server 340. In response to such access, transactional logic 330 and analytics 335 may generate queries against data 336 of data store 335 and return results to UI applications 324 as is known in the art.

Key user 315 may operate component 320 as described above, and also to create UI changes as is known in the art. For example, key user 315 may enter an adaptation mode during execution of a UI application 324. In this mode, key user 315 may change UI nodes of the UI application 324. The UI changes may include creating, moving, destroying, hiding, unhiding, renaming and changing other characteristics of one or more UI nodes. The UI changes may be saved to UI changes 337 of data store 335.

Condenser 350 may operate as described herein to receive UI changes 337 associated with a particular UI application and to condense the received UI changes 337 to a smaller subset of UI changes. Condenser 350 includes condenser logic 355 which may implement an algorithm as described herein. Such an algorithm may call change type handlers 356 which provide information specific to various UI change types as will be described below. Similarly, reduced changes data structure 357 and UI reconstructions data structure 358 are used during execution of the algorithm as will be described below.

FIGS. 4A through 4F comprise a flow diagram of process 400 to provide a UI application and condensed UI changes according to some embodiments. A request for a UI application is received at S402. As described above, in some embodiments of S402, a user may operate a client to execute a Web browser application, input a Uniform Resource Locator associated with a UI application host, and select a displayed UI control to launch a respective UI application.

Next, at S404, a plurality of UI changes associated with respective UI nodes of the UI application are identified. The identified plurality of UI changes may have been created by one or more users, such as one or more key users and/or administrators, and stored in a back-end database in association with the UI application to which they apply. The UI changes may be identified from the backend database at S404.

The identified UI changes are ordered based on creation time at S406. Establishing the time-based order of UI changes may be important to determine a final intended result of multiple UI changes which may be associated with a single UI node. The last-in-time UI change of the ordered UI changes is determined at S408.

FIG. 5 is a tabular representation of UI changes 500 according to some embodiments. Each record (i.e., row) of UI changes 500 includes data associated with one of the identified UI changes. UI changes 500 are shown sorted by creation time as described above. UI changes 500 includes only non-index-related changes in order to simplify the present explanation but, as will be seen below, embodiments may operate in conjunction with index-related UI changes and combinations of non-index-related and index-related UI changes.

At S410, the change type of the last-in-time UI change is determined. As shown in FIG. 5, change types (for non-index-related UI changes) may include Rename, Property, and Hide/Unhide. Embodiments may support any other suitable non-index-related UI change types. A handler associated with the determined change type is called at S412. Continuing the present example, a Rename change type handler of change type handlers 356 is called at S412 to determine a node affected by the UI change, a classification type, a resolution type and an identifier of the UI change. With reference to UI changes 500, the Rename change type handler returns node FN, classification type non-index-related, resolution type last-one-wins, and identifier C7 at S412.

Flow proceeds from S414 to either S416 or S434 based on the classification type of the determined UI change. The UI change may be classified as non-index-related or index-related. In the present example, flow proceeds to S416 because the classification type of UI change C7 is non-index-related.

At S416, a reduced changes data structure is searched for an entry which is associated with the affected UI node, classification type, resolution type and affected UI node characteristic. Flow proceeds from S418 to S420 if it is determined that no such an entry exists. According to the present example, since UI change C7 is the first UI change encountered by process 400, the reduced changes data structure is empty and flow proceeds to S420.

At S420, an entry is created in the reduced changes data structure based on the UI change data. FIG. 6 illustrates example reduced changes data structure 600 after creation of the entry according to some embodiments. As shown, data structure 600 of FIG. 6 defines a hierarchy for storing UI changes, in decreasing sort order, by UI node, classification type, resolution type, and affected UI node characteristic.

Flow proceeds from S420 to S424 to determine whether more UI changes remain to be processed. If so, the next-last-in-time UI change is determined at S426 and flow returns to S410. With respect to UI changes 500, UI change C6 is determined at S426 and the change type of the UI change is determined to be Property at S410.

Accordingly, a Property change type handler is called at S412 to determine the affected UI node (i.e., FN), the classification type (i.e., non-index-related), the resolution type (i.e., last-one-wins) and UI change identifier (C6). Since the classification type is non-index-related, the reduced changes data structure is again searched for a corresponding entry at S416. Again no such entry exists and is therefore created at S420, as illustrated in FIG. 7.

Flow proceeds as described above through S424, S426, S410 and S412 to determine UI change C5 and call the Rename change type handler to determine the affected UI node (i.e., FN), the classification type (i.e., non-index-related), the resolution type (i.e., last-one-wins) and UI change identifier (C5). Next, at S416 and S418, it is determined that an entry exists in data structure 600 which corresponds to UI node FN, classification type non-index-related, resolution type last-one-wins and affected UI node characteristic "label". Flow therefore proceeds to S422 to determine whether the existing entry is associated with the last-one-wins resolution type. In the present example, flow therefore proceeds to S424 without creating an entry corresponding to the current UI change (i.e., UI change C5). Conceptually, UI change C5 may be ignored because it is superseded by UI change C7.

Flow continues as described above to process UI changes C4 and C3. Both of changes C4 and C3 are associated with UI node FN, the non-index-related classification type, the reverse resolution type and the UI node characteristic visible. Accordingly, entries are created for each UI change during successive iterations of S420. Examples of such entries are shown in FIG. 8.

With respect to remaining UI changes C2 and C1, each of these UI changes is associated with the last-one-wins resolution type and with existing entries (C6 and C7, respectively) in data structure 600. Accordingly, no entries are created for UI changes C2 and C1 in data structure 600. Since no more UI changes exist, flow proceeds from S424 to S428 of FIG. 4F.

At S428, it is determined whether any UI nodes are associated with two or more reverse-type non-index-related UI changes for a given UI node characteristic. As shown in FIG. 8, UI node FN is associated with two reverse-type non-index-related UI changes for UI node characteristic "visible". All such identified groups of two or more UI changes are condensed at S430. In the present case, since application of two reverse-type UI changes results in no change to the affected UI node, the two UI changes are condensed to zero UI changes at S430. FIG. 9 shows data structure 600 after condensing the UI changes.

After S430, it is determined at S432 whether the reduced changes data structure includes any index-related changes. Flow proceeds directly from S428 to S432 if no UI nodes are associated with two or more reverse-type non-index-related UI changes for a given UI node characteristic. According to the present example, since data structure 600 does not include any index-related UI changes flow continues to S460. At S460, the requested UI application and the UI changes currently represented in the reduced changes data structure are returned to the requesting client as described above with respect to S260 of process 200.

As described above, process 400 is capable of condensing index-related UI changes as well as non-index-related changes. FIG. 10 is a view of user interface 1010 of UI application 1000 according to some embodiments. FIG. 11 is a tabular representation of index-related UI changes 1100 associated with UI application 1000, and FIG. 12 is a view of user interface 1020 which represents the application of index-related UI changes 1100 to UI application 1000. For purposes of the foregoing example, user interface 1010 will be referred to as an initial UI and user interface 1020 will be referred to as a target UI.

UI interface 1010 includes a single UI container including five UI nodes. UI changes 1100 denote each UI node using the following abbreviations: Company Name=CN; Phone=P; Fax=F; Web Address=URL; and Subject Matter=SM. The node indices of the UI container are, from top to bottom, 0 through 4. Accordingly, the layout of initial UI 1010 may be represented as $CN_0$, $P_1$, $F_2$, $URL_3$, $SM_4$. Similarly, the layout of target UI 1020 may be represented as $P_0$, $SM_1$, $URL_2$, $CN_3$, $F_4$.

It will now be assumed that process 400 is executed with respect to UI changes 1100. Accordingly, UI change C8 of UI changes 1100 is determined at S408 and its change type (i.e., Move) is determined at S410. At S412, a Move change type handler is called to determine an affected UI node (i.e., CN), classification type (i.e., index-related), a resolution type (n/a) and an identifier (i.e., C8) of the UI change. Flow proceeds from S414 to S434 due to the determined classification type.

At S434, a reduced changes data structure is searched for an entry associated with the affected UI node, classification type and change type. The data structure is empty at this point, so flow proceeds from S436 to S438 to create an entry in the data structure based on the data determined at S412. FIG. 13 shows reduced changes data structure 1300 including an entry corresponding to UI change C8.

Flow proceeds to S442 to determine whether more UI changes exist, and then to S444 to get the next-last-in-time UI change (i.e., C7). FIG. 14 shows reduced changes data structure 1300 after repeating the above process with respect to UI changes C7, C6 and C5. Each of these UI changes is associated with a different UI node and a separate entry is therefore created for each UI change.

Upon reaching UI change C4, it is determined at S436 that a corresponding entry exists (i.e., the entry associated with UI change C8). Since the change type of UI change is Move, flow simply continues to S442 to determine if more UI changes exist. Accordingly, no entry is created for UI change C4. UI changes C3, C2 and C1 are processed similarly, since entries corresponding to their affected nodes already exist in reduced changes data structure 1300.

Figure 4A:
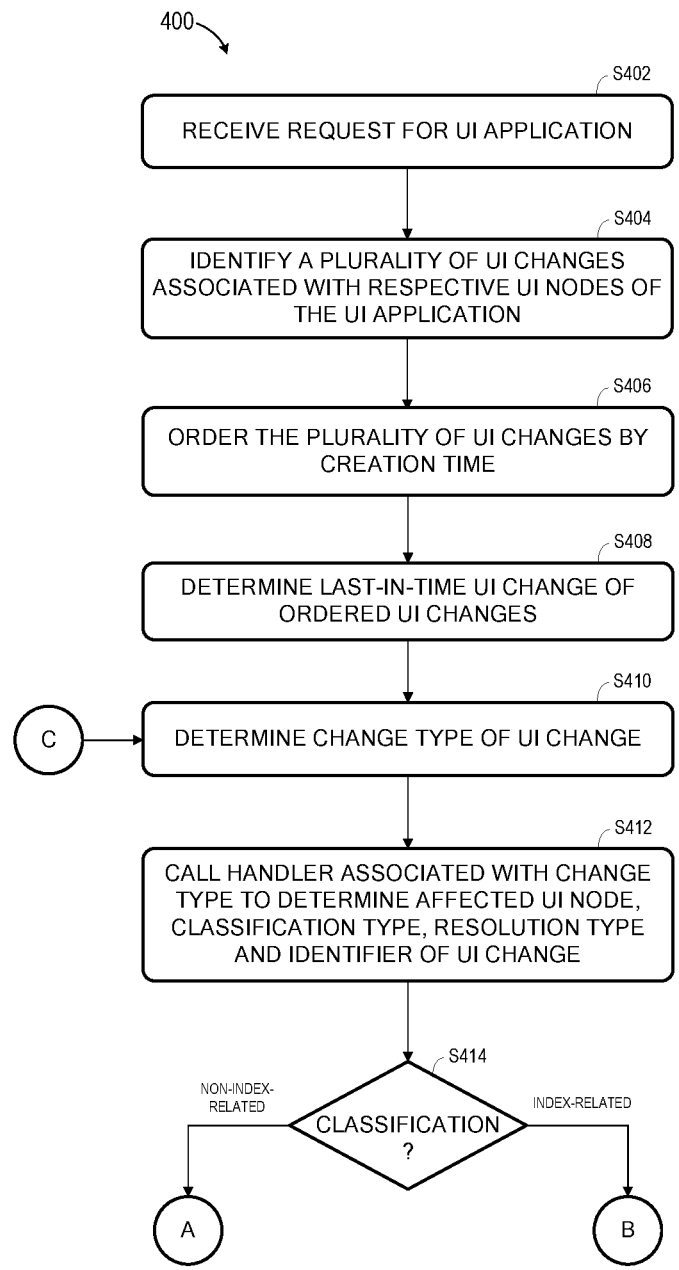
FIGS. 4A through 4F comprise a flow diagram of a process to provide condensed UI changes to end-users according to some embodiments.
Figure 4B:
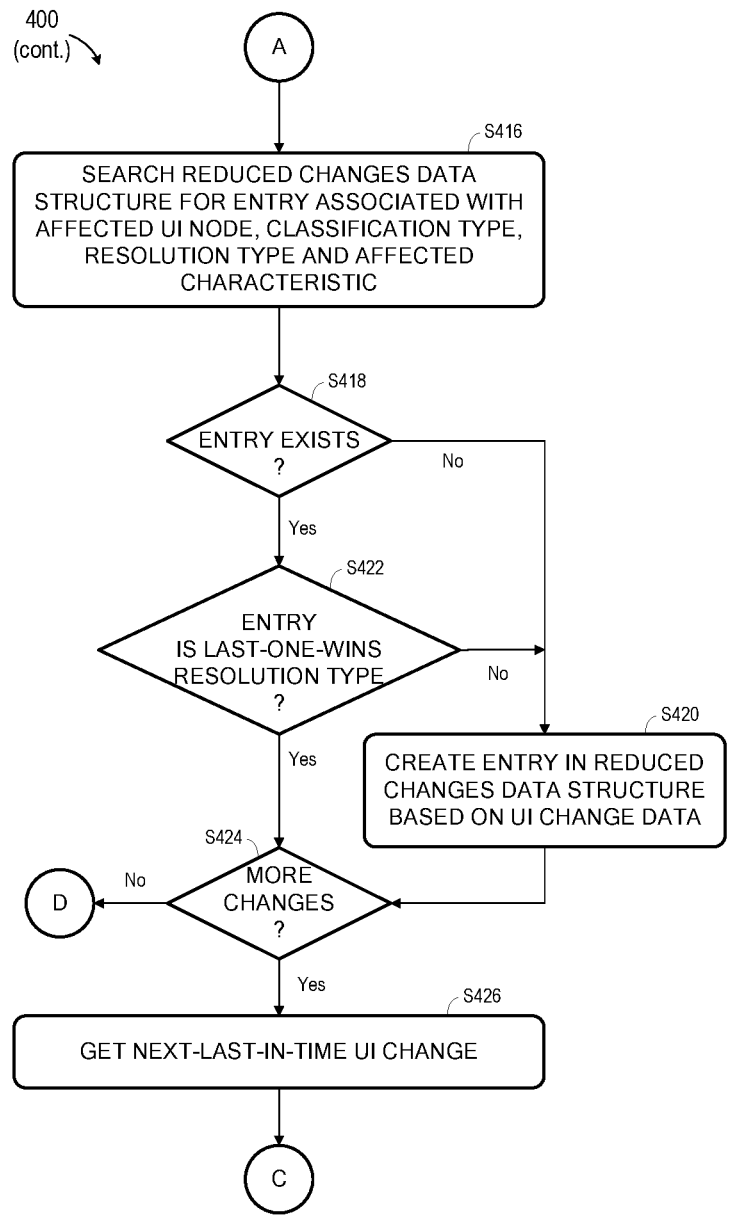
Figure 4C:
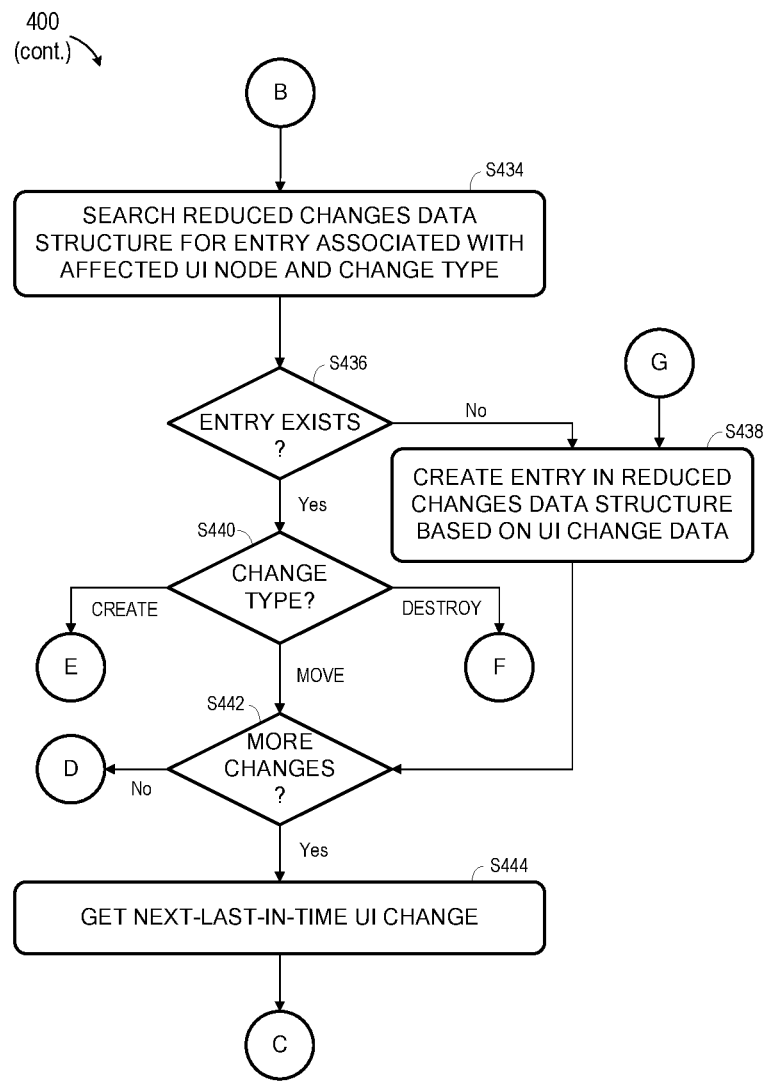
Figure 4D:
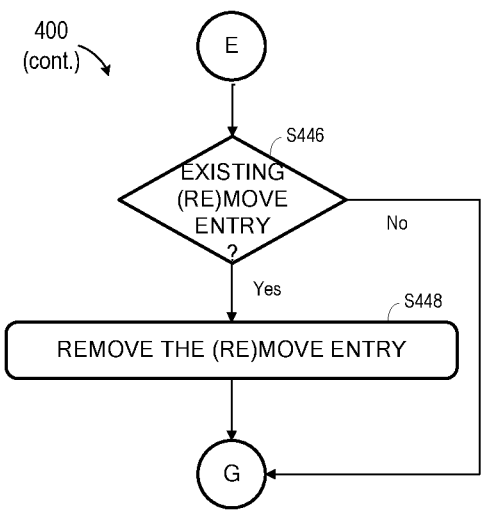
Figure 4E:
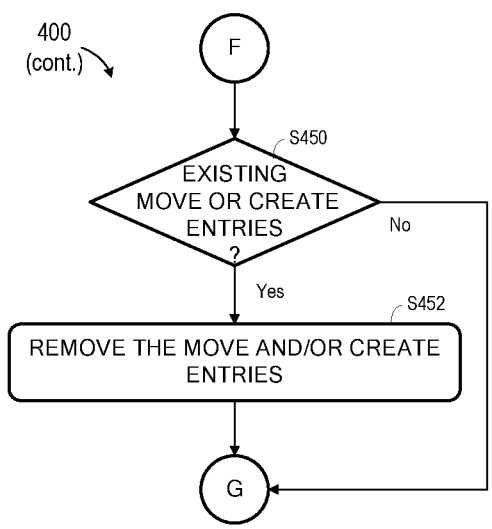
Figure 4F:
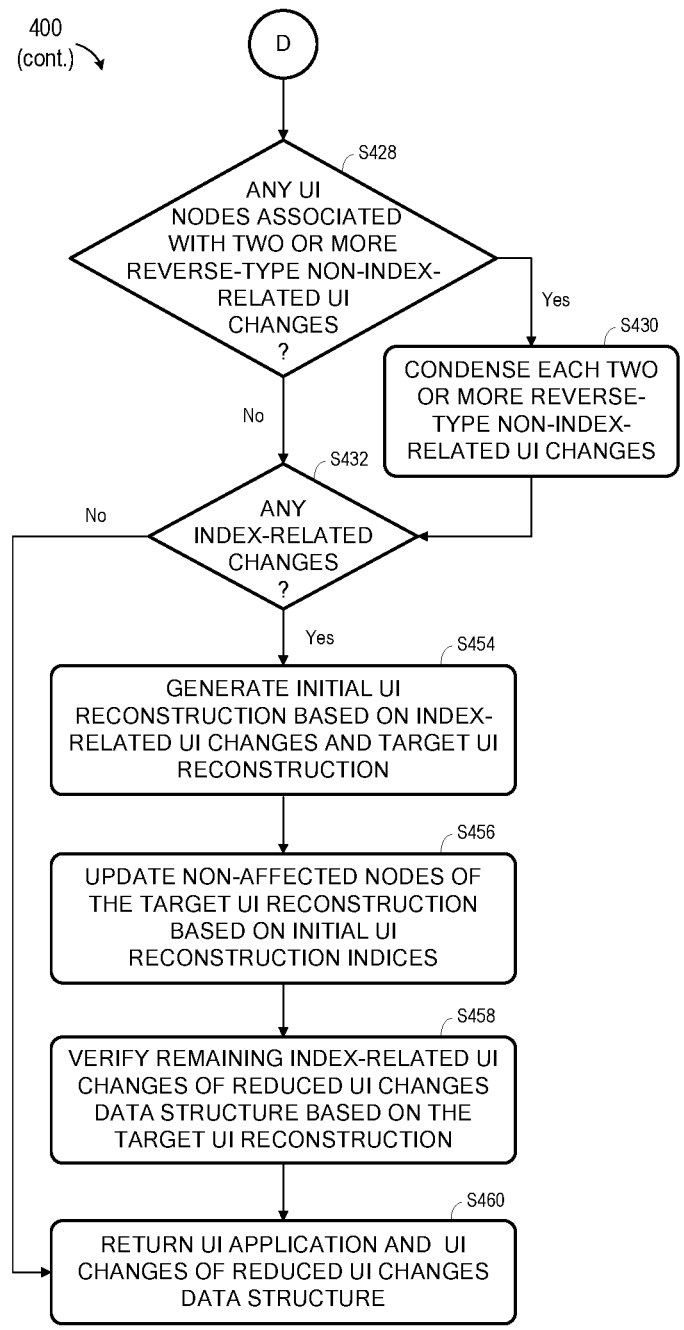

As shown in FIG. 4C, different actions occur if a corresponding entry exists and the UI change type is a Create or Destroy change types. For example, if the UI change type is Create, flow proceeds to S446 to determine whether the existing entry is of the Move or Remove change type. If so, the entry is removed at S448 and flow proceeds to S438 to create an entry corresponding to the current UI change. If not, flow directly proceeds from S446 to S438 to create an entry corresponding to the current UI change.

If the UI change type is Destroy, flow proceeds from S440 to S450 to determine whether the existing entry is of the Move or Create change types. If so, the entry is removed at S452 and flow proceeds to S438 to create an entry corresponding to the current UI change. If not, flow directly proceeds from S450 to S438 to create an entry corresponding to the current UI change.

Flow proceeds from S442 to S428 once all UI changes have been processed. Since no non-index-related changes are present in the current example, flow continues to S432 and on to S454. At S454, an initial UI reconstruction is generated based on the index-related UI changes and the known target UI reconstruction. Generation of the initial UI reconstruction includes rewinding the target UI reconstruction based on the index-related UI changes. For example, if an index-related UI change specifies moving of a node from a source to a target, the node is moved from the target to the source. If a node is to be removed, it will be added. Data structure 1500 of FIG. 15 illustrates an initial UI reconstruction representing UI 1010 and a target UI reconstruction generated based on target UI 1020 and on the UI changes of the reduced data structure.

Non-affected nodes of the target UI reconstruction are updated at S456 based on their initial indices as specified in the initial UI reconstruction. According to the present example, no UI change of UI changes 1100 is associated with UI node F. UI node F is therefore considered a non-affected node. Since the initial index of UI node F was 2, the target UI reconstruction is updated at S456 to $P_0$, $SM_1$, $URL_2$, $CN_3$, $X_2$.

Next, at S458, the remaining index-related UI changes of the reduced changes data structure are verified based on the target UI reconstruction. For example, the remaining index-related UI changes are sorted by ascending timestamp and, if the target UI reconstruction does not include any unknown (i.e., "X") nodes, the index-related UI changes are sorted by ascending target indices. If the target UI reconstruction includes any unknown nodes, the simulated UI reconstruction (i.e., the order in which the index-related changes are currently ordered) is verified. Verification may include application of the remaining index-related UI changes the initial UI reconstruction and verifying whether the simulated UI reconstruction corresponds to the target UI reconstruction. If not, the remaining index-related UI changes are rearranged until the simulated UI reconstruction matches the target UI reconstruction. The sorted index-related UI changes are then swapped among themselves within the previously-sorted list of the remaining UI changes. Finally, at S460, the requested UI application and the UI changes currently represented in the reduced changes data structure are returned to the requesting client as described above with respect to S260 of process 200.

Figure 16:
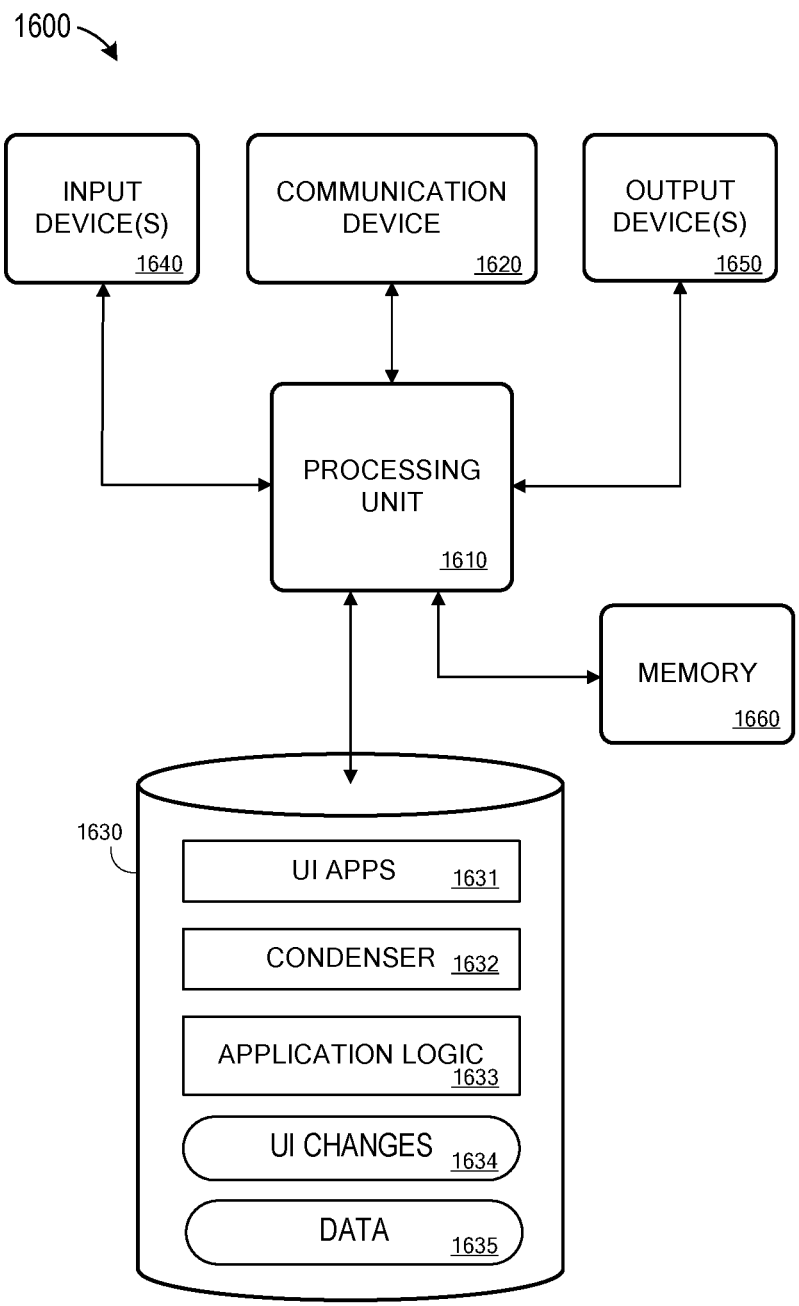
FIG. 16 is a block diagram of a system to provide and support UI applications based on condensed UI changes according to some embodiments.

FIG. 16 is a block diagram of apparatus 1600 according to some embodiments. Apparatus 1600 may comprise a general-purpose computing apparatus and may execute program code to perform any of the functions described herein. Apparatus 1600 may comprise an implementation of application server 340 and database server 330 in some embodiments. The elements of apparatus 1600 may be distributed across several physical devices, and apparatus 1600 may include other unshown elements according to some embodiments.

Apparatus 1600 includes processing unit 1610 operatively coupled to communication device 1620, data storage device 1630, one or more input devices 1640, one or more output devices 1650 and memory 1660. Communication device 1620 may comprise a network card for communication with external networks. Input device(s) 1640 may comprise, for example, a keyboard, a keypad, a mouse or other pointing device, a microphone, knob or a switch, an infra-red (IR) port, a docking station, and/or a touch screen. Input device(s) 1640 may be used, for example, to enter information into apparatus 1600. Output device(s) 1650 may comprise, for example, a display (e.g., a display screen), a speaker, and/or a printer.

Data storage device 1630 may comprise any appropriate persistent storage device, including combinations of magnetic storage devices (e.g., magnetic tape, hard disk drives and flash memory), optical storage devices, Read Only Memory (ROM) devices, etc., while memory 1660 may comprise Random Access Memory (RAM), Storage Class Memory (SCM) or any other fast-access memory.

UI apps 1631, condenser 1632 and application logic 1633 may comprise program code executable by processor 1610 to cause apparatus 1600 to perform any one or more of the processes described herein. Embodiments are not limited to execution of these processes by a single apparatus.

UI changes 1634 and data 1635 may be stored in data storage device 1630 and accessed as described above. Data storage device 1630 may also store other data and/or program code for providing additional functionality and/or which are necessary for operation of apparatus 1600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable program code;
   a processing unit to execute the processor-executable program code to cause the system to:
   identify a plurality of user interface (UI) changes comprising one or more non-index-related UI changes and one or more index-related UI changes, each of the one or more non-index-related UI changes associated with a UI node and a UI node characteristic, and each of the one or more index-related UI changes associated with a UI node index;
   sort each of the one or more non-index-related UI changes based on associated UI node and UI node characteristic;
   condense non-index-related UI changes associated with each UI node characteristic of each UI node to zero or one UI changes associated with each UI node characteristic of each UI node;
   condense each of the one or more index-related UI changes to less than the one or more index-related UI changes based on the UI node indices; and
   transmit the UI application, the condensed non-index-related UI changes and the condensed index-related UI changes to a client system.

2. The system according to claim 1, wherein sorting of each of the one or more non-index-related UI changes based on associated UI node and UI node characteristic comprises:
   determination of a change type associated with each of the one or more non-index-related UI changes; and
   for each of the one or more non-index-related UI changes, calling of a handler associated with the associated change type to determine an affected UI node and a resolution type.

3. The system according to claim 2, wherein condensing of the one or more non-index-related UI changes comprises:
   for each non-index-related UI change:
      determination of whether a reduced changes data structure includes an entry associated with the affected UI node, resolution type and UI node characteristic of the non-index-related UI change; and
      if the reduced changes data structure includes an entry associated with the affected UI node, resolution type and UI node characteristic of the non-index-related UI change, and the non-index-related UI change is associated with a last-one-wins resolution type, ignoring the non-index-related UI change.

4. The system according to claim 1, wherein condensing of the one or more non-index-related UI changes comprises:
   for each non-index-related UI change:
      determination of whether a reduced changes data structure includes an entry associated with the affected UI node, resolution type and UI node characteristic of the non-index-related UI change;
      if the reduced changes data structure includes an entry associated with the affected UI node, resolution type and UI node characteristic of the non-index-related UI change, and the non-index-related UI change is associated with a last-one-wins resolution type, ignoring the non-index-related UI change; and
      if the reduced changes data structure does not include an entry associated with the affected UI node, resolution type and UI node characteristic of the non-index-related UI change, or the non-index-related UI change is not associated with a last-one-wins resolution type, storing an entry in the reduced changes data structure associated with the affected UI node, resolution type and UI node characteristic of the non-index-related UI change.

5. The system according to claim 4, wherein condensing of the one or more index-related UI changes comprises:
   for each index-related UI change:

determination of whether the reduced changes data structure includes an entry associated with the affected UI node and the change type of the index-related UI change; and if the reduced changes data structure includes an entry associated with the affected UI node and the change type of the index-related UI change, and the change type of the index-related UI change is a move change type, ignoring the index-related UI change.

6. The system according to claim 5, wherein condensing of the one or more index-related UI changes comprises:
for each index-related UI change:
if the reduced changes data structure includes an entry associated with the affected UI node and the change type of the index-related UI change, the change type of the index-related UI change is a create change type, and the entry is associated with a move or remove change type, removal of the entry and storage of an entry in the reduced changes data structure associated with the affected UI node and the change type of the index-related UI change; and
if the reduced changes data structure includes an entry associated with the affected UI node and the change type of the index-related UI change, the change type of the index-related UI change is a destroy change type, and the entry is associated with a move or create change type, removal of the entry and storage of an entry in the reduced changes data structure associated with the affected UI node and the change type of the index-related UI change.

7. The system according to claim 1, wherein condensing of the one or more index-related UI changes comprises:
for each index-related UI change:
determination of whether a reduced changes data structure includes an entry associated with the affected UI node and the change type of the index-related UI change;
if the reduced changes data structure includes an entry associated with the affected UI node and the change type of the index-related UI change, and the change type of the index-related UI change is a move change type, ignoring the index-related UI change;
if the reduced changes data structure includes an entry associated with the affected UI node and the change type of the index-related UI change, the change type of the index-related UI change is a create change type, and the entry is associated with a move or remove change type, removal of the entry and storage of an entry in the reduced changes data structure associated with the affected UI node and the change type of the index-related UI change; and
if the reduced changes data structure includes an entry associated with the affected UI node and the change type of the index-related UI change, the change type of the index-related UI change is a destroy change type, and the entry is associated with a move or create change type, removal of the entry and storage of an entry in the reduced changes data structure associated with the affected UI node and the change type of the index-related UI change.

8. A computer-implemented method comprising:
receiving a request from a client system for a user interface (UI) application;
identifying a plurality of UI changes associated with the UI application and comprising one or more non-index-related UI changes and one or more index-related UI changes, each of the one or more non-index-related UI changes associated with a UI node and a UI node characteristic, and each of the one or more index-related UI changes associated with a UI node index;
sorting each of the one or more non-index-related UI changes based on associated UI node and UI node characteristic;
condensing non-index-related UI changes associated with each UI node characteristic of each UI node to zero or one UI changes associated with each UI node characteristic of each UI node;
condensing each of the one or more index-related UI changes to less than the one or more index-related UI changes based on the UI node indices; and
transmitting the UI application, the condensed non-index-related UI changes and the condensed index-related UI changes to the client system.

9. The method according to claim 8, wherein sorting each of the one or more non-index-related UI changes based on associated UI node and UI node characteristic comprises:
determining a change type associated with each of the one or more non-index-related UI changes; and
for each of the one or more non-index-related UI changes, calling a handler associated with the associated change type to determine an affected UI node and a resolution type.

10. The method according to claim 9, wherein condensing the one or more non-index-related UI changes comprises:
for each non-index-related UI change:
determining whether a reduced changes data structure includes an entry associated with the affected UI node, resolution type and UI node characteristic of the non-index-related UI change; and
if the reduced changes data structure includes an entry associated with the affected UI node, resolution type and UI node characteristic of the non-index-related UI change, and the non-index-related UI change is associated with a last-one-wins resolution type, ignoring the non-index-related UI change.

11. The method according to claim 8, wherein condensing of the one or more non-index-related UI changes comprises:
for each non-index-related UI change:
determining whether a reduced changes data structure includes an entry associated with the affected UI node, resolution type and UI node characteristic of the non-index-related UI change;
if the reduced changes data structure includes an entry associated with the affected UI node, resolution type and UI node characteristic of the non-index-related UI change, and the non-index-related UI change is associated with a last-one-wins resolution type, ignoring the non-index-related UI change; and
if the reduced changes data structure does not include an entry associated with the affected UI node, resolution type and UI node characteristic of the non-index-related UI change, or the non-index-related UI change is not associated with a last-one-wins resolution type, storing an entry in the reduced changes data structure associated with the affected UI node, resolution type and UI node characteristic of the non-index-related UI change.

12. The method according to claim 11, wherein condensing of the one or more index-related UI changes comprises:
for each index-related UI change:
determining whether the reduced changes data structure includes an entry associated with the affected UI node and the change type of the index-related UI change; and if the reduced changes data structure includes an entry associated with the affected UI node and the change type of the index-related UI change, and the change type of the index-related UI change is a move change type, ignoring the index-related UI change.

13. The method according to claim 12, wherein condensing of the one or more index-related UI changes comprises:
for each index-related UI change:
if the reduced changes data structure includes an entry associated with the affected UI node and the change type of the index-related UI change, the change type of the index-related UI change is a create change type, and the entry is associated with a move or remove change type, removing the entry and storing an entry in the reduced changes data structure associated with the affected UI node and the change type of the index-related UI change; and
if the reduced changes data structure includes an entry associated with the affected UI node and the change type of the index-related UI change, the change type of the index-related UI change is a destroy change type, and the entry is associated with a move or create change type, removing the entry and storing an entry in the reduced changes data structure associated with the affected UI node and the change type of the index-related UI change.

14. The method according to claim 8, wherein condensing of the one or more index-related UI changes comprises:
for each index-related UI change:
determining whether a reduced changes data structure includes an entry associated with the affected UI node and the change type of the index-related UI change;
if the reduced changes data structure includes an entry associated with the affected UI node and the change type of the index-related UI change, and the change type of the index-related UI change is a move change type, ignoring the index-related UI change;
if the reduced changes data structure includes an entry associated with the affected UI node and the change type of the index-related UI change, the change type of the index-related UI change is a create change type, and the entry is associated with a move or remove change type, removing the entry and storage of an entry in the reduced changes data structure associated with the affected UI node and the change type of the index-related UI change; and
if the reduced changes data structure includes an entry associated with the affected UI node and the change type of the index-related UI change, the change type of the index-related UI change is a destroy change type, and the entry is associated with a move or create change type, removing the entry and storing an entry in the reduced changes data structure associated with the affected UI node and the change type of the index-related UI change.

15. A non-transitory medium storing processor-executable process steps, the process steps executable to cause a system to:
receive a request from a client system for a user interface (UI) application;
identify a plurality of UI changes associated with the UI application and comprising one or more non-index-related UI changes and one or more index-related UI changes, each of the one or more non-index-related UI changes associated with a UI node and a UI node characteristic, and each of the one or more index-related UI changes associated with a UI node index;
sort each of the one or more non-index-related UI changes based on associated UI node and UI node characteristic;
condense non-index-related UI changes associated with each UI node characteristic of each UI node to zero or one UI changes associated with each UI node characteristic of each UI node;
condense each of the one or more index-related UI changes to less than the one or more index-related UI changes based on the UI node indices; and
transmit the UI application, the condensed non-index-related UI changes and the condensed index-related UI changes to the client system.

16. The non-transitory medium according to claim 15, wherein sorting of each of the one or more non-index-related UI changes based on associated UI node and UI node characteristic comprises:
determination of change type associated with each of the one or more non-index-related UI changes; and
for each of the one or more non-index-related UI changes, calling of a handler associated with the associated change type to determine an affected UI node and a resolution type.

17. The non-transitory medium according to claim 16, wherein condensing of the one or more non-index-related UI changes comprises:
for each non-index-related UI change:
determination of whether a reduced changes data structure includes an entry associated with the affected UI node, resolution type and UI node characteristic of the non-index-related UI change; and
if the reduced changes data structure includes an entry associated with the affected UI node, resolution type and UI node characteristic of the non-index-related UI change, and the non-index-related UI change is associated with a last-one-wins resolution type, ignoring of the non-index-related UI change.

18. The non-transitory medium according to claim 15, wherein condensing of the one or more non-index-related UI changes comprises:
for each non-index-related UI change:
determination of whether a reduced changes data structure includes an entry associated with the affected UI node, resolution type and UI node characteristic of the non-index-related UI change;
if the reduced changes data structure includes an entry associated with the affected UI node, resolution type and UI node characteristic of the non-index-related UI change, and the non-index-related UI change is associated with a last-one-wins resolution type, ignoring of the non-index-related UI change; and
if the reduced changes data structure does not include an entry associated with the affected UI node, resolution type and UI node characteristic of the non-index-related UI change, or the non-index-related UI change is not associated with a last-one-wins resolution type, storage of an entry in the reduced changes data structure associated with the affected UI node, resolution type and UI node characteristic of the non-index-related UI change.

19. The non-transitory medium according to claim 18, wherein condensing of the one or more index-related UI changes comprises:
for each index-related UI change:

determination of whether the reduced changes data structure includes an entry associated with the affected UI node and the change type of the index-related UI change; and if the reduced changes data structure includes an entry associated with the affected UI node and the change type of the index-related UI change, and the change type of the index-related UI change is a move change type, ignoring of the index-related UI change.

20. The non-transitory medium according to claim 19, wherein condensing of the one or more index-related UI changes comprises:

for each index-related UI change:

if the reduced changes data structure includes an entry associated with the affected UI node and the change type of the index-related UI change, the change type of the index-related UI change is a create change type, and the entry is associated with a move or remove change type, removal of the entry and storage of an entry in the reduced changes data structure associated with the affected UI node and the change type of the index-related UI change; and if the reduced changes data structure includes an entry associated with the affected UI node and the change type of the index-related UI change, the change type of the index-related UI change is a destroy change type, and the entry is associated with a move or create change type, removal of the entry and storage of an entry in the reduced changes data structure associated with the affected UI node and the change type of the index-related UI change.

* * * * *